US012252159B2

(12) United States Patent
Stuhaug et al.

(10) Patent No.: US 12,252,159 B2
(45) Date of Patent: *Mar. 18, 2025

(54) METHOD FOR HANDLING MALFUNCTIONING VEHICLES ON A RAIL SYSTEM AND A STORAGE AND RETRIEVAL SYSTEM USING SUCH A METHOD

(71) Applicant: Autostore Technology AS, Nedre Vats (NO)

(72) Inventors: Ragnar Stuhaug, Skjold (NO); Øystein Gjerdevik, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,595

(22) Filed: Dec. 19, 2023

(65) Prior Publication Data
US 2024/0132119 A1 Apr. 25, 2024
US 2024/0227871 A9 Jul. 11, 2024

Related U.S. Application Data

(63) Continuation of application No. 17/059,220, filed as application No. PCT/EP2019/065185 on Jun. 11, 2019, now Pat. No. 11,891,095.

(30) Foreign Application Priority Data

Jun. 12, 2018 (NO) .................................. 20180813
Jul. 19, 2018 (NO) .................................. 20181005
May 24, 2019 (NO) .................................. 20190666

(51) Int. Cl.
B65G 1/04 (2006.01)
B60W 50/00 (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
CPC .... B61B 13/00; B65G 1/0414; B65G 1/0457; B65G 1/0464; B65G 1/0471;
(Continued)

(56) References Cited

U.S. PATENT DOCUMENTS 3,519,150 A 7/1970 Keena et al.
3,800,963 A 4/1974 Holland
(Continued)

FOREIGN PATENT DOCUMENTS

CA 2988122 A1 12/2016
CN 101553416 A 10/2009
(Continued)

OTHER PUBLICATIONS

Office Action issued in the counterpart Chinese Patent Application No. 201980039066.2, mailed on Sep. 10, 2021 (10 pages).
(Continued)

Primary Examiner — Michael Collins
(74) Attorney, Agent, or Firm — Baker Botts L.L.P.

(57) ABSTRACT

A method for handling malfunctioning vehicles on a rail system constituting part of a storage and retrieval system includes storing a plurality of stacks of storage containers and a control system. The storage and retrieval system includes a plurality of remotely operated vehicles configured to move laterally on the rail system. The method includes wirelessly monitoring and controlling, via the control system, movements of the plurality of vehicles. The method includes forming the control system by wireless data communication including: registering an anomaly in an operational condition of a vehicle on the rail system; registering
(Continued)

the vehicle with the anomalous operational condition as a malfunctioning vehicle; bringing the malfunctioning vehicle to a halt; registering a halt position of the malfunctioning vehicle relative to the rail system; setting up a two-dimensional shutdown zone within the rail system into which the malfunctioning vehicle is halted; and updating movement pattern of the plurality of remotely operated vehicles outside the two-dimensional shutdown zone such that entrance into the two-dimensional shutdown zone is avoided.

19 Claims, 8 Drawing Sheets

(51) Int. Cl.

| | | |
|---|---|---|
| B61B 13/00 | (2006.01) | |
| B65G 1/06 | (2006.01) | |
| B65G 1/137 | (2006.01) | |
| B65G 43/00 | (2006.01) | |
| B65G 47/06 | (2006.01) | |
| B65G 47/52 | (2006.01) | |
| B65G 57/03 | (2006.01) | |
| B65G 63/00 | (2006.01) | |
| B65G 63/06 | (2006.01) | |
| B65G 65/23 | (2006.01) | |
| B65G 67/24 | (2006.01) | |
| B66F 9/06 | (2006.01) | |
| B66F 9/19 | (2006.01) | |
| G05D 1/00 | (2024.01) | |
| G05D 1/223 | (2024.01) | |
| G05D 1/249 | (2024.01) | |
| G05D 1/69 | (2024.01) | |
| G05D 1/692 | (2024.01) | |
| G05D 1/247 | (2024.01) | |
| G05D 1/43 | (2024.01) | |
| G05D 1/693 | (2024.01) | |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *G05D 1/223* (2024.01); *G05D 1/69* (2024.01); *G05D 1/692* (2024.01); B60W 50/0098 (2013.01); B60W 2710/06 (2013.01); B60W 2720/10 (2013.01); B60W 2720/24 (2013.01); B65G 1/1378 (2013.01); B65G 43/00 (2013.01); B65G 63/004 (2013.01); B65G 2201/0235 (2013.01); B65G 2201/0258 (2013.01); B65G 2203/0283 (2013.01); B65G 2203/042 (2013.01); G05D 1/02 (2013.01); G05D 1/0229 (2013.01); G05D 1/0231 (2013.01); G05D 1/0259 (2013.01); G05D 1/0289 (2013.01); G05D 1/247 (2024.01); G05D 1/249 (2024.01); G05D 1/43 (2024.01); G05D 1/693 (2024.01)

(58) Field of Classification Search
CPC .. B65G 1/0478; B65G 1/0485; B65G 1/0492; B65G 1/065; B65G 1/1375; B65G 47/06; B65G 47/52; B65G 57/03; B65G 63/06; B65G 65/23; B65G 67/24; B65G 1/1378; B65G 43/00; B65G 63/004; B65G 2201/0235; B65G 2201/0258; B65G 2203/0283; B65G 2203/042; B66F 9/063; B66F 9/19; G05D 1/0011; G05D 1/021; G05D 1/0291; G05D 1/02; G05D 1/0229; G05D 1/0231; G05D 1/0259; G05D 1/0289; G05D 2201/0216; B60W 50/0098; B60W 2710/06; B60W 2720/10; B60W 2720/24

See application file for complete search history.

(56) References Cited

U.S. PATENT DOCUMENTS

| | | | |
|---|---|---|---|
| 4,538,950 | A | 9/1985 | Shiomi et al. |
| 4,909,697 | A | 3/1990 | Bernard, II et al. |
| 5,538,809 | A | 7/1996 | Bittihn et al. |
| 7,101,139 | B1 | 9/2006 | Benedict |
| 8,628,289 | B1 | 1/2014 | Benedict et al. |
| 9,527,669 | B1 | 12/2016 | Hanssen et al. |
| 9,802,761 | B2 | 10/2017 | Buzan et al. |
| 11,891,095 | B2 * | 2/2024 | Stuhaug .................. G05D 1/69 |
| 2003/0093176 | A1 | 5/2003 | Ohtsuka et al. |
| 2005/0047895 | A1 | 3/2005 | Lert |
| 2008/0014066 | A1 | 1/2008 | Kolesa et al. |
| 2011/0027059 | A1 | 2/2011 | Benedict et al. |
| 2012/0185080 | A1 | 7/2012 | Cyrulik et al. |
| 2012/0282068 | A1 | 11/2012 | Tschurwald et al. |
| 2014/0014470 | A1 | 1/2014 | Razumov |
| 2014/0086714 | A1 | 3/2014 | Malik |
| 2014/0277693 | A1 | 9/2014 | Naylor |
| 2014/0288696 | A1 | 9/2014 | Lert |
| 2014/0292274 | A1 | 10/2014 | Dorval et al. |
| 2014/0311858 | A1 | 10/2014 | Keating et al. |
| 2015/0066283 | A1 | 3/2015 | Wurman et al. |
| 2015/0127143 | A1 | 5/2015 | Lindbo et al. |
| 2015/0225187 | A1 | 8/2015 | Razumov |
| 2016/0060037 | A1 | 3/2016 | Razumov |
| 2016/0145058 | A1 | 5/2016 | Lindbo |
| 2016/0176638 | A1 | 6/2016 | Toebes |
| 2016/0325932 | A1 | 11/2016 | Hognaland |
| 2017/0050809 | A1 | 2/2017 | Itoh et al. |
| 2017/0057745 | A1 | 3/2017 | Ueda et al. |
| 2017/0166400 | A1 | 6/2017 | Hofmann |
| 2018/0044110 | A1 | 2/2018 | Clarke et al. |
| 2018/0068253 | A1 | 3/2018 | Simms et al. |
| 2018/0082162 | A1 | 3/2018 | Durham et al. |
| 2018/0118078 | A1 | 5/2018 | Alkhaldi et al. |
| 2018/0134206 | A1 | 5/2018 | Grivetti et al. |
| 2018/0141754 | A1 | 5/2018 | Garrett et al. |
| 2018/0150793 | A1 | 5/2018 | Lert, Jr. et al. |
| 2019/0009984 | A1 | 1/2019 | Hognaland et al. |
| 2020/0148474 | A1 | 5/2020 | Salichs et al. |
| 2022/0392273 | A1 | 12/2022 | Austrheim et al. |
| 2023/0002156 | A1 * | 1/2023 | Gjerdevik ............ B65G 1/0492 |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |

(56) References Cited

FOREIGN PATENT DOCUMENTS

| | | |
|---|---|---|
| CN | 106829298 A | 6/2017 |
| CN | 206790852 U | 12/2017 |
| CN | 108140168 A | 6/2018 |
| DE | 4016810 C1 | 11/1991 |
| DE | 9310690 U1 | 9/1993 |
| DE | 102009017241 A1 | 10/2010 |
| EP | 0458021 A1 | 11/1991 |
| EP | 2881905 A1 | 6/2015 |
| EP | 3003932 A1 | 4/2016 |
| EP | 3288865 A1 | 3/2018 |
| GB | 1 267 751 A | 3/1972 |
| GB | 1276160 A | 6/1972 |
| GB | 2211822 A | 7/1989 |
| GB | 2233319 A | 1/1991 |
| JP | S60-137703 A | 7/1985 |
| JP | S6417707 A | 1/1989 |
| JP | H04226202 A | 8/1992 |
| JP | H06-043936 A | 2/1994 |
| JP | H07-067623 B2 | 7/1995 |
| JP | H08-217209 A | 8/1996 |
| JP | H09152914 A | 6/1997 |
| JP | H11-143538 A | 5/1999 |
| JP | 2000-191106 A | 7/2000 |
| JP | 2003-137406 A | 5/2003 |
| JP | 2009-184775 A | 8/2009 |
| JP | 2011-102166 A | 5/2011 |
| JP | 2015-535517 A | 12/2015 |
| JP | 2017088404 A | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2005/077789 A1 | 8/2005 |
| WO | 2010118412 A1 | 10/2010 |
| WO | 2012/106746 A1 | 8/2012 |
| WO | 2014/075937 A1 | 5/2014 |
| WO | 2014/090684 A1 | 6/2014 |
| WO | 2014145437 A1 | 9/2014 |
| WO | 2014/195901 A1 | 12/2014 |
| WO | 2015/084236 A1 | 6/2015 |
| WO | 2015/140216 A1 | 9/2015 |
| WO | 2015/170660 A1 | 11/2015 |
| WO | 2015/185628 A2 | 12/2015 |
| WO | 2015/193278 A1 | 12/2015 |
| WO | 2016/166294 A1 | 10/2016 |
| WO | 2016166323 A1 | 10/2016 |
| WO | 2016172793 A1 | 11/2016 |
| WO | 2016/196815 A1 | 12/2016 |
| WO | 2016/198467 A1 | 12/2016 |
| WO | 2016/198565 A1 | 12/2016 |
| WO | 2017/081281 A1 | 5/2017 |
| WO | 2017081273 A1 | 5/2017 |
| WO | 2017/121512 A1 | 7/2017 |
| WO | 2017/121515 A1 | 7/2017 |
| WO | 2017148939 A1 | 9/2017 |
| WO | 2017153563 A1 | 9/2017 |
| WO | 2017/211640 A1 | 12/2017 |
| WO | 2017220651 A1 | 12/2017 |
| WO | 2018/162757 A1 | 9/2018 |

OTHER PUBLICATIONS

Search issued in the counterpart chinese Patent Application No. 201980039066.2, mailed on Sep. 6, 2021 (3 pages).
Office Action issued in Chinese Application No. 201980037162.3; Dated Sep. 27, 2021 (8 pages).
Extended European Search Report issued in European Application No. 21186410.3, dated Nov. 25, 2021 (5 pages).
Office Action issued in the counterpart Chinese Patent Application No. 201980037723X, mailed on Sep. 17, 2021 (25 pages).
Office Action issued in the counterpart Chinese Patent Application No. 2019800383353, mailed on Dec. 17, 2021 (3 pages).
Office Action in counterpart Chinese Patent Application No. 201980039028.7 issued on Oct. 27, 2021 (15 pages).
Office Action in counterpart Chinese Patent Application No. 201980039068.1 issued on Sep. 15, 2021 (23 pages).
Office Action issued in Chinese Application No. 2019800388569 mailed on Oct. 19, 2021 (16 pages).
Office Action issued in Chinese Application No. 201980039046.5 mailed on Sep. 15, 2021 (18 pages).
Office Action in counterpart Chinese Patent Application No. 2019800538763 issued on Dec. 6, 2021 (13 pages).
Office Action in counterpart Chinese Patent Application No. 2019800393798 issued on Dec. 9, 2021 (17 pages).
United States Office Action in related U.S. Appl. No. 16/972,482, mailed Mar. 22, 2022 (46 pages).
Office Action issued in counterpart Japanese Patent Application No. 2020-568727 mailed on Mar. 30, 2023 (8 pages).
Notification of Reasons for Rejection issued in Japanese Application No. 2020-568727, mailed on Mar. 30, 2023 (8 pages).
Office Action in the counterpart Japanese Application No. 2020-569128, mailed Jul. 3, 2023 (6 pages).
Office Action issued in counterpart Japanese Patent Application No. 2020-569128 mailed on Jul. 3, 2023 (6 pages).
Office Action issued in counterpart Japanese Patent Application No. 2020-569140 mailed on Jun. 2, 2023 (5 pages).
Office Action issued in counterpart Japanese Patent Application No. 2020-568714 mailed on Jul. 3, 2023 (16 pages).
Office Action issued in counterpart Japanese Patent Application No. 2020-568805 mailed on Jun. 5, 2023 (7 pages).
Office Action in the counterpart Japanese Applicaiton No. 2020-568712, mailed Jun. 26, 2023 (7 pages).
Office Action issued in the counterpart European Patent Application No. 19730155.9, mailed on Sep. 4, 2023 (6 pages).
Office Action in Counterpart Chinese Application No. 201980038106.1 issued on Sep. 8, 2021 (6 pages).
Office Action issued in counterpart Japanese Patent Application No. 2020-568698 mailed on May 29, 2023 (10 pages).
ISR WOISA of Sep. 12, 2019 in PCT/EP2019065165.
ISR WOISA of Sep. 12, 2019 in PCT/EP2019065153.
NOSR of Feb. 6, 2019.
NOSR of Feb. 28, 2020.

* cited by examiner

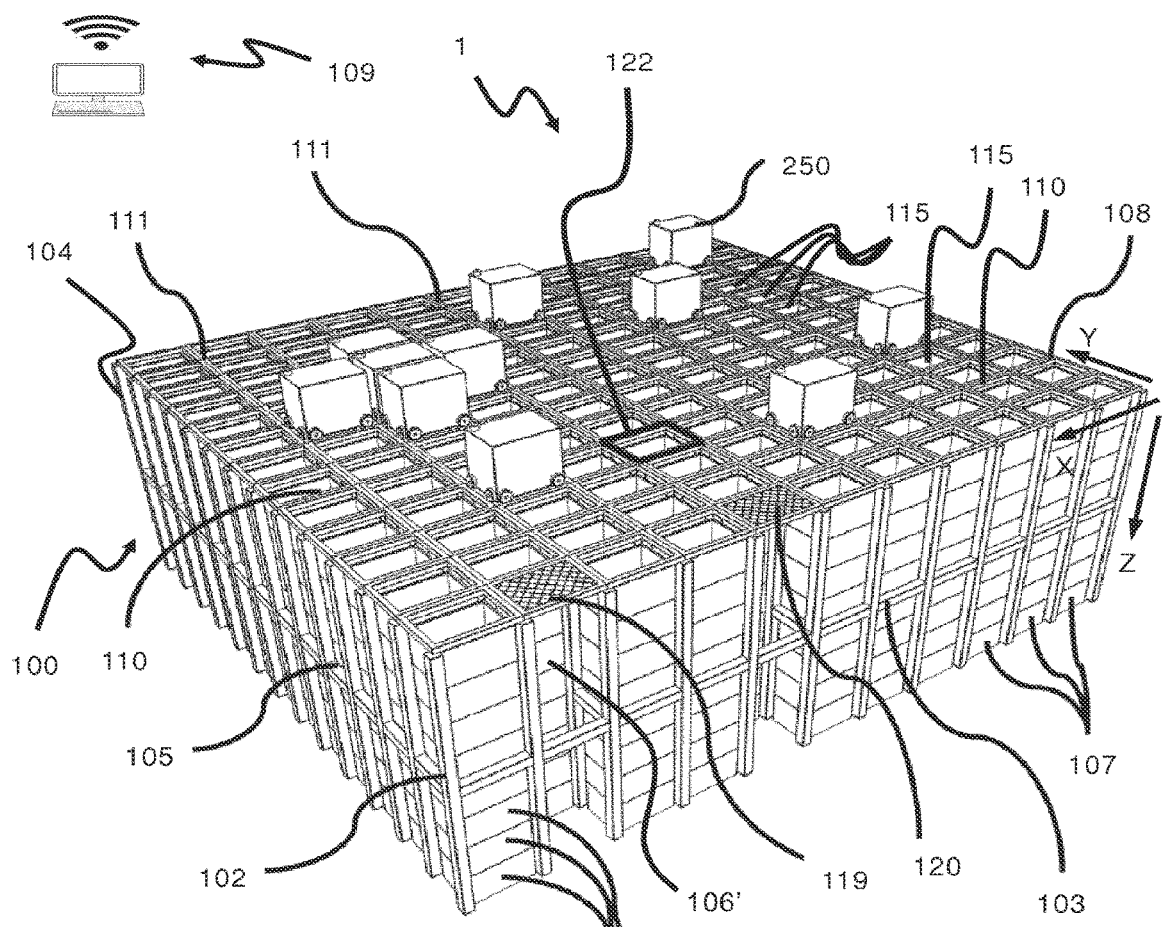
Fig. 1A (Prior Art)
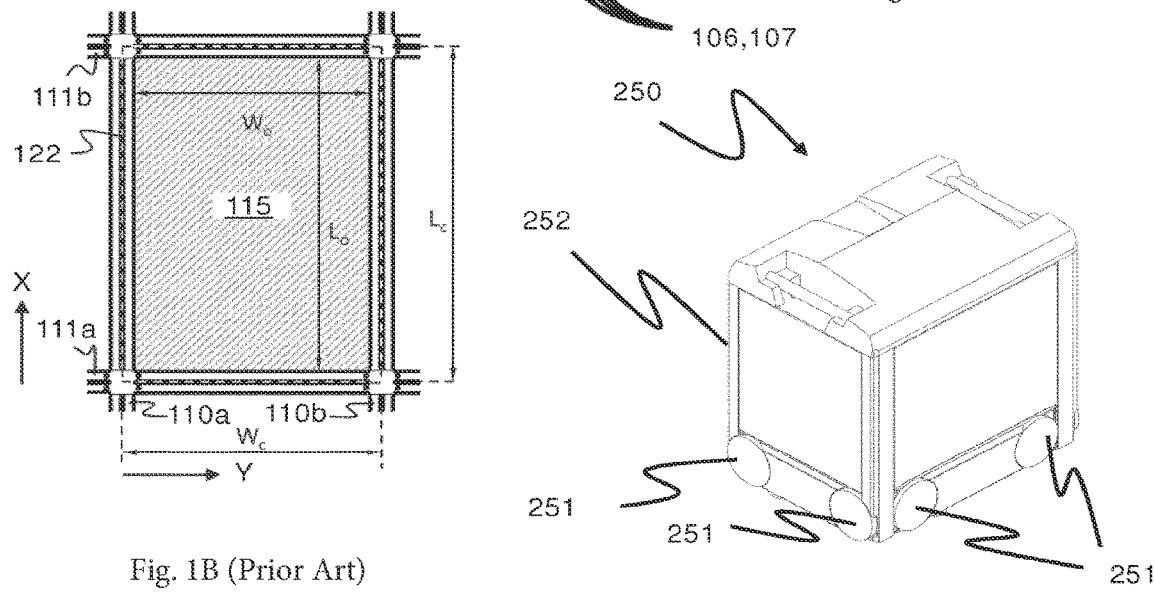
Fig. 1B (Prior Art)
Fig. 1C (Prior Art)

METHOD FOR HANDLING MALFUNCTIONING VEHICLES ON A RAIL SYSTEM AND A STORAGE AND RETRIEVAL SYSTEM USING SUCH A METHOD

TECHNICAL FIELD

The present invention relates to a method for handling malfunctioning vehicles on a rail system constituting part of a storage and retrieval system configured to store a plurality of stacks of storage containers, a storage and retrieval system and a control system carrying out the method.

BACKGROUND AND PRIOR ART

FIG. 1A discloses a typical prior art automated storage and retrieval system 1 with a framework structure 100.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106 (also known as bins) are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 250 (as exemplified in FIG. 1C) are operated to raise storage containers 106 from, and lower storage containers 106 into, the storage columns 105, and also to transport the storage containers 106 above the storage columns 105. The horizontal extent of one of the grid cells 122 constituting the grid pattern is in FIG. 1A marked by thick lines.

The rail system 108 comprises a first set of parallel rails 110 arranged to guide movement of the container handling vehicles 250 in a first direction X across the top of the frame structure 100, and a second set of parallel rails 111 arranged perpendicular to the first set of rails 110 to guide movement of the container handling vehicles 250 in a second direction Y which is perpendicular to the first direction X. In this way, the rail system 108 defines grid columns above which the container handling vehicles 250 can move laterally above the storage columns 105, i.e. in a plane which is parallel to the horizontal X-Y plane.

The rail system 108 may be a single rail system or a double rail system as is shown in FIG. 1B. The latter rail configuration allows a container handling vehicle 250 having a footprint generally corresponding to the lateral area defined by a grid cell 122 to travel along a row of grid columns even if another container handling vehicle 250 is positioned above a grid cell neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of neighboring rails 110a,110b of the first set of rails 110 and a pair of neighboring rails 111a,111b of the second set of rails 111.

Consequently, rails 110a and 110b form pairs of rails defining parallel rows of grid cells running in the X direction, and rails 111a and 111b form pairs of rails defining parallel rows of grid cells running in the Y direction.

As shown in FIG. 1B, each grid cell 122 (indicated by a dashed box) has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

FIG. 1C discloses a prior art container handling vehicle 250 operating the system 1 disclosed in FIG. 1A. Each prior art container handling vehicle 250 comprises a vehicle body 252 and a wheel arrangement 251 of eight wheels, where a first set of four wheels enable the lateral movement of the container handling vehicles 250 in the X direction and a second set of the remaining four wheels enable the lateral movement in the Y direction. One or both sets of wheels in the wheel arrangement 251 can be lifted and lowered, so that the first set of wheels and/or the second set of wheels can be engaged with the respective set of rails 110, 111 at any one time.

Each prior art container handling vehicle 250 also comprises a lifting device (not shown) for vertical transportation of storage containers 106, e.g. raising a storage container 106 from, and lowering a storage container 106 into, a storage column 105. The lifting device may comprise one or more gripping/engaging devices which are adapted to engage a storage container 106, and which gripping/engaging devices can be lowered from the vehicle 250 so that the position of the gripping/engaging devices with respect to the vehicle can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIG. 1A, Z=8 identifies the lowermost, bottom layer of the grid 104. Consequently, as an example, and using the Cartesian coordinate system X, Y, Z indicated in FIG. 1A, the storage container identified as 106' in FIG. 1A can be said to occupy grid location or cell X=10, Y=2, Z=3. The container handling vehicles 250 can be said to travel in layer Z=0 and each grid column can be identified by its X and Y coordinates.

Each container handling vehicle 250 comprises a storage compartment or space (not shown) for receiving and stowing a storage container 106 when transporting the storage container 106 across the rail system 108. The storage space may comprise a cavity arranged centrally within the vehicle body 252, e.g. as is described in WO2014/090684A1, the contents of which are incorporated herein by reference.

The container handling vehicles 250 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles may have a footprint which is larger than the lateral extent of (lateral area defined by) a grid column 105, e.g. as is disclosed in WO2014/090684A1.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 250 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grid 104 in FIG. 1A comprises two delivery columns 119 and 120. The first delivery column 119 may for example comprise a dedicated drop-off port where the container handling vehicles 250 can drop off storage containers 106 to be transported through the delivery column 119 and further to an access or a transfer station, and the second delivery column 120 may comprise a dedicated pick-up port where the container handling vehicles 250 can pick up storage containers 106 that have been transported through the delivery column 120 from an access or a transfer station. Each of the ports of the first and second delivery column may comprise a port suitable for both pick up and drop of storage containers.

The second location may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

A conveyor system may also be arranged to transfer storage containers between different storage grids, e.g. as is described in WO2014/075937A1, the contents of which are incorporated herein by reference.

When a storage container 106 stored in the storage grid 104 disclosed in FIG. 1A is to be accessed, one of the container handling vehicles 250 is instructed to retrieve the target storage container 106 from its position in the grid 104 and transport it to or through the transfer column 119. This operation involves moving the container handling vehicle 250 to a grid location above the storage column 105 in which the target storage container 106 is positioned, retrieving the storage container 106 from the storage column 105 using the container handling vehicle's lifting device (not shown), and transporting the storage container 106 to the transfer column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 250 that is subsequently used for transporting the target storage container 106 to the transfer column, or with one or a plurality of other cooperating container handling vehicles 250. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 250 is instructed to pick up the storage container 106 from the transfer column 120 and to transport it to a grid location above the storage column 105 where it is to be stored. After any storage containers positioned at or above the target position within the storage column stack 107 have been removed, the container handling vehicle 250 positions the storage container 106 at the desired position. The removed storage containers may then be lowered back into the storage column 105 or relocated to other storage columns 105.

For monitoring and controlling the automated storage and retrieval system 1 so that a desired storage container 106 can be delivered to the desired location at the desired time without the container handling vehicles 250 colliding with each other, the automated storage and retrieval system 1 comprises a control system 109, which typically is computerized and comprises a database for monitoring and controlling e.g. the location of the respective storage containers 106 within the storage grid 104, the content of each storage container 106 and the movement of the container handling vehicles 250.

A problem associated with known automated storage and retrieval systems 1 is that it is challenging for personnel to access the rail system 108 for carrying out inspection, or to carry out maintenance of or to remove malfunctioning container handling vehicles 250.

Another important problem with maintenance or removal of malfunctioning vehicles 250 is that a complete shutdown of the system 1 is needed for the personnel to access with low or zero risk of injury. In particular for large systems 1, for example systems 1 with excess of 500 vehicles in operation simultaneously, a complete shutdown is highly undesired due to significant cost for the operator.

It is therefore an aim of the present invention to provide an automated storage and retrieval system 1, a method for operating such a system and a control system 109 running such a method, that solves or at least mitigates one or more of the aforementioned problems related to the use of prior art storage and retrieval systems.

A particular objective is to provide one or more solutions that allows personnel to enter the rail system while preventing a complete shutdown.

SUMMARY OF THE INVENTION

The present invention is set forth and characterized in the independent claims, while the dependent claims describe other characteristics of the invention.

In a first aspect, the invention concerns a method for handling malfunctioning vehicles on a rail system constituting part of a storage and retrieval system configured to store a plurality of stacks of storage containers.

The storage and retrieval system comprises a plurality of remotely operated vehicles configured to move laterally on the rail system, i.e. within a horizontal plane P set up by the rail system, and a control system for monitoring and controlling wirelessly movements of the plurality of vehicles.

The method performs by wireless data communication with the control system at least the following steps:
A. registering an anomaly in an operational condition of a vehicle on the rail system, for example any anomalies in the vehicle's movement pattern, velocity, temperature, or battery status,
B. registering the vehicles with the anomalous operational condition as a malfunctioning vehicle,
C. bringing the malfunctioning vehicle to a halt,
D. registering a halt position of the malfunctioning vehicle relative to the supporting rail system,
E. setting up by the control system a two-dimensional shutdown zone within the rail system into which the malfunctioning vehicle is halted, for example a shutdown zone extending at least one grid cell, more preferably at least two grid cells, from the malfunctioning vehicle in some or all directions along the horizontal plane P, and
F. updating movement pattern of the plurality of remotely operated vehicles located outside the two-dimensional shutdown zone such that entrance into the two-dimensional shutdown zone is avoided.

The rail system may comprise a first set of parallel rails arranged in the horizontal plane P and extending in a first direction X and a second set of parallel rails arranged in the horizontal plane P and extending in a second direction Y which is orthogonal to the first direction X. The first and second sets of rails form a grid pattern in the horizontal plane P comprising a plurality of adjacent grid cells, each comprising a grid opening defined by a pair of adjacent rails of the first set of rails and a pair of adjacent rails of the second set of rails. The rails are preferably all of type double track rails. But they may also be of type single track rails or a combination of double track rails and single track rails.

In a preferred example the method further comprises the step of rerouting at least one of the plurality of vehicles other than the malfunctioning vehicle to a position on the rail system located at or near a lateral boundary of the two-dimensional shutdown zone and bringing the at least one vehicle to a halt.

For example, 'at or near a lateral boundary' may be defined as the location where the one or more vehicles are located outside the shutdown zone set by the control system, but with at least one outer extremity in the horizontal plane P at a position at or near position coordinates of the shutdown zone.

Alternatively, the one or more boundary defining vehicles may be located inside the shutdown zone set by the control system, but with at least one outer extremity in the horizontal plane P at a position at or near position coordinates of the shutdown zone.

In a second alternative configuration, the one or more boundary defining vehicles may be located with their lateral center position on position coordinates of the shutdown zone.

The position coordinates of the shutdown zone are preferably based on the particular position of the grid cells in the horizontal plane P. For example, position coordinate 15,20 may signify the location of the grid cell at X=15 and Y=20 counted from a reference lateral corner of the rail system.

In both cases, functioning vehicles may be employed to form a barrier extending around, or around in part, the malfunctioning vehicle. These functioning vehicles, halted on or adjacent the boundary of the shutdown zone (e.g. just inside or just outside) may be referred to herein as "boundary defining vehicles".

When the boundary defining vehicles are brought to a halt, additional means may be performed to optimize stability of the barrier such as maximizing contact with the underlying rail system by lowering all set of wheels and/or to lower/raise a storage container to a halfway position through the grid so that the storage container acts as a block within the grid space. It may also be possible to arrange the boundary defining vehicles in several layers along the horizontal plane P. For example, a second layer of boundary defining vehicles may partly overlap the boundary defining vehicles of the innermost layer to spread the forces in the event of an impact.

In another preferred example the method further comprises determining, after step E or F, whether other vehicles are operating within the two-dimensional shutdown zone. If this is the case, the method may further comprise rerouting said additional vehicles to continue operation outside the two-dimensional shutdown zone or bringing said additional vehicles to a halt within or at the shutdown zone if one or more additional vehicles are operating within the two-dimensional shutdown zone, or a combination of both. One or more additional vehicles can be brought to a halt too at specific locations outside of the two-dimensional shutdown zone.

In yet another preferred example the method further comprises guiding a service vehicle to a position at or within the shutdown zone, for example from an access port at a lateral boundary of the rail system or any another location on or outside the rail system where an operator is able to enter the service vehicle and drive or be driven by the service vehicle to the intended destination of the rail system.

The service vehicle may comprise one, preferably two, caterpillar track(s) configured to drive the service vehicle on top of the rail system.

In yet another preferred example the method further comprises dynamically rerouting any operating vehicles outside the shutdown zone to avoid physical impact with the service vehicle during transport of the service vehicle to the shutdown zone.

The dynamical rerouting of some of the operating vehicles may in addition, or alternatively, involve creating a physical barrier that partly or fully surrounds the service vehicle during its movement to the shutdown zone in order to further reduce the risk of injury to the operator of the service vehicle due to undesired collisions.

In yet another preferred example the method further comprises the step of rerouting a multiple number of the plurality of vehicles other than the malfunctioning vehicle to positions on the rail system located at or near a boundary of the two-dimensional shutdown zone to create a physical barrier of vehicles around the malfunctioning vehicle and bringing the multiple number of vehicles to a halt, thereby forming a physical barrier partly or fully enclosing the two-dimensional shutdown zone.

If the vehicles create a physical barrier that completely surrounds the malfunctioning vehicle, the control system may be configured to send a signal to one or more of the barrier creating vehicles when the service vehicle is near or at the barrier to create the necessary opening for the service vehicle to enter the opening or to re-block the opening.

The physical barrier of vehicles may comprise an opening with a width larger than the width of the service vehicle, but less than the width of the service vehicle plus the width of one of the operating vehicles, thereby allowing the service vehicle to enter the shutdown zone or to form part of the physical barrier.

A minimum width is hereinafter defined as a minimum one-dimensional size of an opening, e.g. perpendicular to a direction of entry or the service vehicle, corresponding to the width of the service vehicle when seen from above.

In yet another preferred example the rail system comprises a first rail system, a second rail system and a vehicle blocking barrier such as a wall or fence arranged between the first and the second rail system. The vehicle blocking barrier comprises in this example a vehicle passage having a minimum lateral width allowing one of the plurality of vehicles to move into the vehicle passage.

The method may further comprise the step of rerouting at least one of the plurality of vehicles other than the malfunctioning vehicle to a position within the vehicle passage and bringing the at least one vehicle to a halt, thereby preventing other operating vehicles to move between the first and the second rail system through the vehicle passage. Thus, the rerouted vehicle or vehicles may be seen to plug the gap in the vehicle blocking barrier, i.e. to block the vehicle passage.

When forming a physical barrier, the vehicles may be arranged adjacent each other in a close-packed formation, or they may be spaced apart but with a gap between them of less than the width of a vehicle.

In yet another preferred example the automated storage and retrieval system comprises a transport rail system at height $H_T$ onto which a plurality of remotely operated container handling vehicles are configured to move laterally and a delivery rail system at height $H_D$ less than $H_T$ onto which a plurality of remotely operated container delivery vehicles are configured to move laterally and to receive storage containers from the higher located container handling vehicles. The height difference $H_T - H_D$ is preferably at least the height of the tallest container delivery vehicle.

In this particular example the method steps B-F are performed for the plurality of container handling vehicles in a case where the control system registers an anomaly in an operational condition of a container handling vehicle and/or for the plurality of container delivery vehicles in a case where the control system registers an anomaly in an operational condition of a delivery handling vehicle.

Each of the plurality of container handling vehicles may be configured to lift the storage containers stacked in the stacks through openings in the transport rail system using a lifting device, to move the storage containers to other locations on the transport rail system by aid of for example wheels and driving motor(s) and to lower the storage containers down to the delivery rail system using the lifting device.

Further, the transport rail system may comprise a first set of parallel rails arranged in a first direction X and a second set of parallel rails arranged in a second direction Y orthogonal to the first direction X. As mentioned above, the rails of the transport rail system are preferably of type double track rails. But they may also be of type single track rails or a combination of double and single track rails.

Each of the plurality of container delivery vehicles comprises propulsion means such as a set of wheels or belts configured to move the container delivery vehicle along or on top of the rails of the delivery rail system and a drive motor configured to provide power to the propulsion means such as rotational power to one or more wheels or belts, and a container carrier configured to receive the storage container from above and onto, or at least partly into, the container carrier, preferably so that contents within the storage container are accessible by a robot arm or a human operator.

The delivery rail system may comprise a first set of parallel rails arranged in a first direction X and a second set of parallel rails arranged in a second direction Y orthogonal to the first direction X. As for the transport rail system, the rails of the delivery rail system are preferably of type double track rails. But they may also be of type single track rails or a combination of double and single track rails. The delivery rail system may comprise a first rail system located within the framework structure of the storage grid, and a second rail system located outside the framework structure of the storage grid, and wherein the first and second rail system are connected such that the delivery vehicle may operate between said rail systems.

In yet another preferred example the transport rail system may comprise a plurality of laterally spaced apart transport rail system modules onto which the plurality of container handling vehicles are moving. The delivery rail system may in this example be configured such that one or more of the plurality of container delivery vehicles are allowed to move uninterrupted below all or some of the plurality of laterally spaced apart transport rail system modules during normal operation.

In yet another preferred example the method further comprises the step of rerouting the plurality of container delivery vehicles away from a two-dimensional zone projected down onto the delivery rail system from any two-dimensional shutdown zones set up on the transport rail system, thereby optimizing the efficiency of the system operation.

In a second aspect of the invention, a storage and retrieval system is obtained by a method in accordance with any of the above mentioned features.

In a third aspect of the invention, a storage and retrieval system is configured to store a plurality of stacks of storage containers.

The storage and retrieval system comprises
- a rail system comprising a first set of parallel rails arranged in the horizontal plane P and extending in a first direction X and a second set of parallel rails arranged in the horizontal plane P and extending in a second direction Y which is orthogonal to the first direction X, wherein the first and second sets of rails form a grid pattern in the horizontal plane P comprising a plurality of adjacent grid cells, each comprising a grid opening defined by a pair of adjacent rails of the first set of rails and a pair of adjacent rails of the second set of rails,
- a plurality of remotely operated vehicles configured to move laterally on the rail system and
- a control system for monitoring and controlling wirelessly movements of the plurality of vehicles, wherein the control system is further configured to register an anomaly in one or more operational conditions of a vehicle on the rail system, such as, for example, movement patterns, temperatures, temperature distribution, battery status, stability etc, to register the vehicle with the anomalous operational condition(s) as a malfunctioning vehicle, to bring the malfunctioning vehicle to a halt, to register a halt position of the malfunctioning vehicle relative to the supporting rail system, to set up a two-dimensional shutdown zone within the rail system in which the malfunctioning vehicle has been halted and to update a movement pattern of the remaining plurality of remotely operated vehicles outside the two-dimensional shutdown zone such that entry into the two-dimensional shutdown zone is avoided.

The shutdown zone may be any zone that allows for maintenance work to be conducted. If the shutdown zone is located a distance from the rail system boundary, the zone may be of size n×m grid cells, where n and m are both integers of 2 or more. For example, n and/or m may be integers representing 3, 4, 5 or more grid cells.

The minimum size of the shutdown zone is preferably set such that it allows sufficiently safe working room for the operator and/or provide a sufficient impact buffer in the event of a collision from an operating container handling vehicle outside the shutdown zone.

If no physical barrier is present at the boundaries of the shutdown zone, the size of the shutdown zone may be set to be sufficiently large to ensure a safe halt from a vehicle passes the boundary to well before it reaches the location of the malfunctioning vehicle.

In a fourth aspect of the invention, a control system comprising a computer program that, when executed on a processor, is configured to perform the method according to the steps of any of the above-mentioned method features.

In the following description, numerous specific details are introduced to provide a thorough understanding of embodiments of the method and its related automated storage and retrieval system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

The following drawings are appended to facilitate the understanding of the invention:

FIG. 1 is a perspective view of a prior art automated storage and retrieval system, where FIG. 1A shows the complete system, FIG. 1B shows a top view of a prior art double rail grid and FIG. 1C shows an example of a system operable prior art container handling vehicle.

FIG. 3A shows a situation where a shutdown zone has been created by a control system into which a malfunctioning container handling vehicle is parked, FIG. 3B shows a situation where a service vehicle is moving towards the shutdown zone while operative container handling vehicles have been instructed to create a physical barrier at the shutdown zone boundaries and FIG. 3C shows a situation where the service vehicle is entering the shutdown down.

FIG. 5A shows a part of the system having a delivery rail system with container delivery vehicles operating below the rail system of container handling vehicles and FIG. 5B shows an example of a container delivery vehicle having a storage container stored within.

FIG. 7A shows a service vehicle having two set of wheels configured to follow the rails in X and Y directions and FIG. 7B shows a service vehicle having caterpillar tracks configured to drive on top of the rail system.

DETAILED DESCRIPTION OF THE INVENTION

Figure 2:
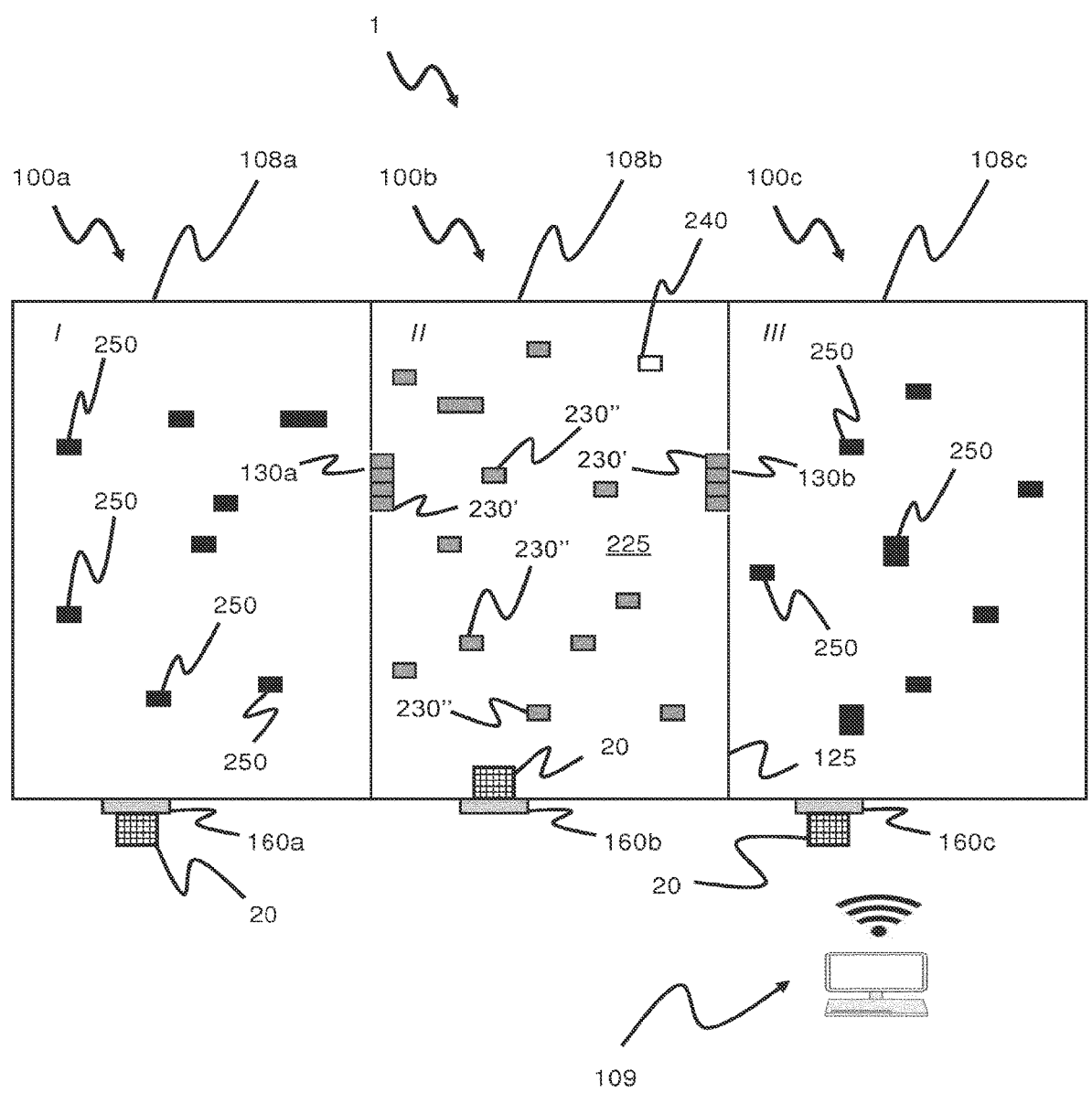
FIG. 2 is a schematic top view of an automated storage and retrieval system according to a first embodiment of the invention, wherein the system is divided into three subsystems by physical barriers.

In the following, embodiments of the invention will be discussed in more detail with reference to the appended drawings. It should be understood, however, that the drawings are not intended to limit the invention to the subject-matter depicted in the drawings.

With reference to FIG. 1 the automated storage and retrieval system 1 comprises a framework structure 100 which includes a storage grid 104 of in total 1144 grid cells, where the width and length of the grid 104 corresponds to the width and length of 143 grid columns. The top layer of the framework structure 100 is a rail system 108 onto which a plurality of container handling vehicles 250 are operated.

The framework structure 100 may be constructed in accordance with the prior art framework structure 100 described above, i.e. a plurality of upright members 102 and a plurality of horizontal members 103 which are supported by the upright members 102.

The rail system 108 includes parallel rails 110,111 along the X direction and the Y direction, respectively, arranged across the top of storage columns 105. The horizontal area of a grid cell 122 delimiting the opening into the storage column 105 may be defined by the distance between adjacent rails 110 and 111, respectively.

In FIG. 1, a single grid cell 122 is marked on the rail system 108 by thick lines in FIG. 1A and shown in a top view in FIG. 1B.

The rail system 108 allows the container handling vehicles 250 to move horizontally between different grid locations, where each grid location is associated with a grid cell 122.

In FIG. 1A the storage grid 104 is shown with a height of eight cells. It is understood, however, that the storage grid 104 can in principle be of any size. In particular, It is understood that storage grid 104 can be considerably wider and/or longer than disclosed in FIG. 1. For example, the grid 104 may have a horizontal extension of more than 700×700 grid cells 122. Also, the grid 104 can be considerably deeper than disclosed in FIGS. 1 and 2. For example, the storage grid 104 may have a depth corresponding to a stable 107 of ten storage containers 106 or more.

All container handling vehicles 250 may be controlled by a remote control system 109.

The container handling vehicles 250 may be of any type known in the art, e.g. any one of the automated container handling vehicles disclosed in WO2014/090684 A1, in NO317366 or in WO2015/193278A1.

FIG. 2 shows a top view of an automated storage and retrieval system 1 according to a first embodiment of the invention. The system 1 comprises three framework structures 100*a*-*c*, each having a storage grid 104 with stacks 107 of storage containers 106, a rail system 108*a*-*c* arranged on top of the storage grid 104 and an access port 160*a*-*c*. The framework structures 100*a*-*c* are separated by two vehicle blocking barriers 125, e.g., walls, arranged between the rail systems 108*a*-*c*. Each of the barriers 125 includes one or more passages 130*a*,*b* in which container handling vehicles 250 may drive through during normal operation.

In FIG. 2 a particular situation is depicted where a container handling vehicle 240 has been labeled malfunctional and brought to a halt at a location on the mid rail system 108*b*. As a response to the presence of the malfunctioning vehicle 240, some of the container handling vehicles 230' are instructed by a control system 109 to move into the passages 130*a*,*b* of both barriers 125 to create two continuous (e.g., at least having no gaps which a vehicle can pass through) physical barriers along the entire length of the rail system 108*a*-*c*, thereby preventing operative container handling vehicles 250 located on the left and right rail systems 108*a*,108*c* to enter the mid rail system 108*b*. Any remaining container handling vehicles 230" still in operation on the mid rail system 108*b* are brought to a halt. Consequently, there will be no container handling vehicles 250 operative within the mid rail system 108*b*. Such a zone will hereinafter be called a shutdown zone 225.

All of the above-mentioned steps are controlled and monitored by a remote control system 109.

With no operative vehicles 250 within the shutdown zone 225, an operator may enter the rail system 108*b* via a mid access port 160*b*. The operator may choose to walk to, for example, the malfunctioning vehicle 240 on foot.

However, in a preferred example of the method, a service vehicle 20 enters the mid rail system 108*b* via the mid access port 160*b* and drives across the mid rail system 108*b* to, for example, the malfunctioning container handling vehicle 240, preferably with an onboard operator.

To minimize the risk of injury or accidents, the above step of entering the rail system 108 with a service vehicle 20 through an access port 160 is preferably performed after the above described process of creating the shutdown zone 225. But the step may also be performed, or initiated, during the process if this is considered sufficiently safe.

The access ports 160*a*-*c* may be adjacent to a mezzanine outside the boundary of the rail systems 108, for supporting the service vehicle 20 while it is inactive.

In FIG. 2, an access port 160*a*-*c* and a service vehicle 20 is depicted for each of the rail systems 108*a*-*c*. However, other configurations may be envisaged such as an arrangement of only one mid access port 160*b*, allowing entrance of a service vehicle 20 into the mid rail system 108*b*. In case a malfunctioning vehicle 240 is brought to a halt in the left rail system 108*a* or the right rail system 108*c*, the service vehicle 20 may, with such a configuration, travel through the respective passage 130*a*,*b* and into the affected rail system 108*a*,*c*. To reduce the risk of a collision of an operative container handling vehicle 250 with the service vehicle 20 during its movement across the mid rail system 108*b*, these container handling vehicles 250 in this zone may be temporary halted and/or temporary rerouted away from the service vehicle 20.

Figure 3:
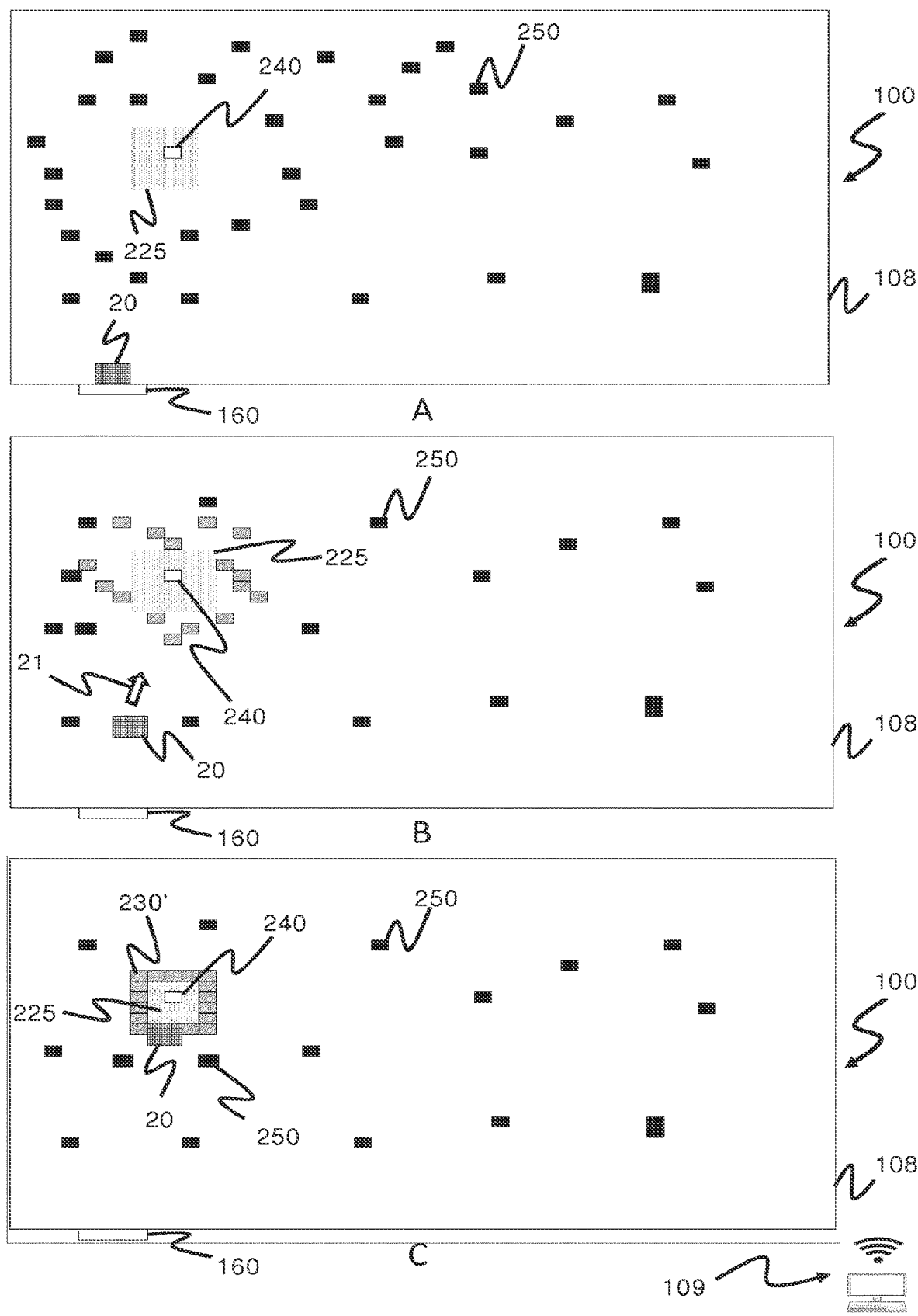
FIG. 3 is a schematic top view of an automated storage and retrieval system according to a second embodiment of the invention, where

FIG. 3 shows a second embodiment where the automated storage and retrieval system 1 includes a single framework structure 100 having a rail system 108 and an underlying storage grid 104 with stacks 107 of storage containers 106.

Three different stages of the inventive method as illustrated in FIG. 3A-C:

FIG. 3A shows the situation where the control system 109 has
- detected a malfunctioning container handling vehicle 240,
- brought the malfunctioning vehicle 240 to a halt and
- generated a shutdown zone 225 of size 6×5 grid cells into which the halted malfunctioning vehicle 240 is located.

FIG. 3B shows a later situation where the control system 109 has
- instructed a service vehicle 20 to drive from an access port 160 to the shutdown zone 225 and
- instructed sixteen 230' of the operative container handling vehicles 250 to move towards the boundaries of the generated shutdown zone 225 to create a physical barrier partly surrounding the malfunctioning vehicle 240 and
- rerouting all other operative container handling vehicles 250 to prevent (or at least significantly reduce the risk of) collisions between an operative container handling vehicle 250 and the service vehicle 20 when the service vehicle 20 is travelling between the access port 160 and the shutdown zone. The general direction of the service vehicle 20 is indicated by a double line arrow 21.

FIG. 3C shows yet a later situation where the service vehicle 20 has
- partly entered an opening in the physical barrier of vehicles 230'.

Whilst the operator is on the service vehicle 20, he or she may be relatively safe, protected by safety barriers fitted around a cockpit area of the service vehicle. Once the service vehicle 20 has entered the shutdown zone 225, the operator may want to step off the service vehicle 20 to service the malfunctioning vehicle 240. Thus, at this point any operator previously on the service vehicle 20 may at this latter stage perform work on the malfunctioning vehicle 240 while out of the protection of the service vehicle 20. The work may involve any in-situ maintenance work and/or transport of the vehicle 240 on the service vehicle 20 to another location, for example a workshop outside the rail system 108.

Figure 4:
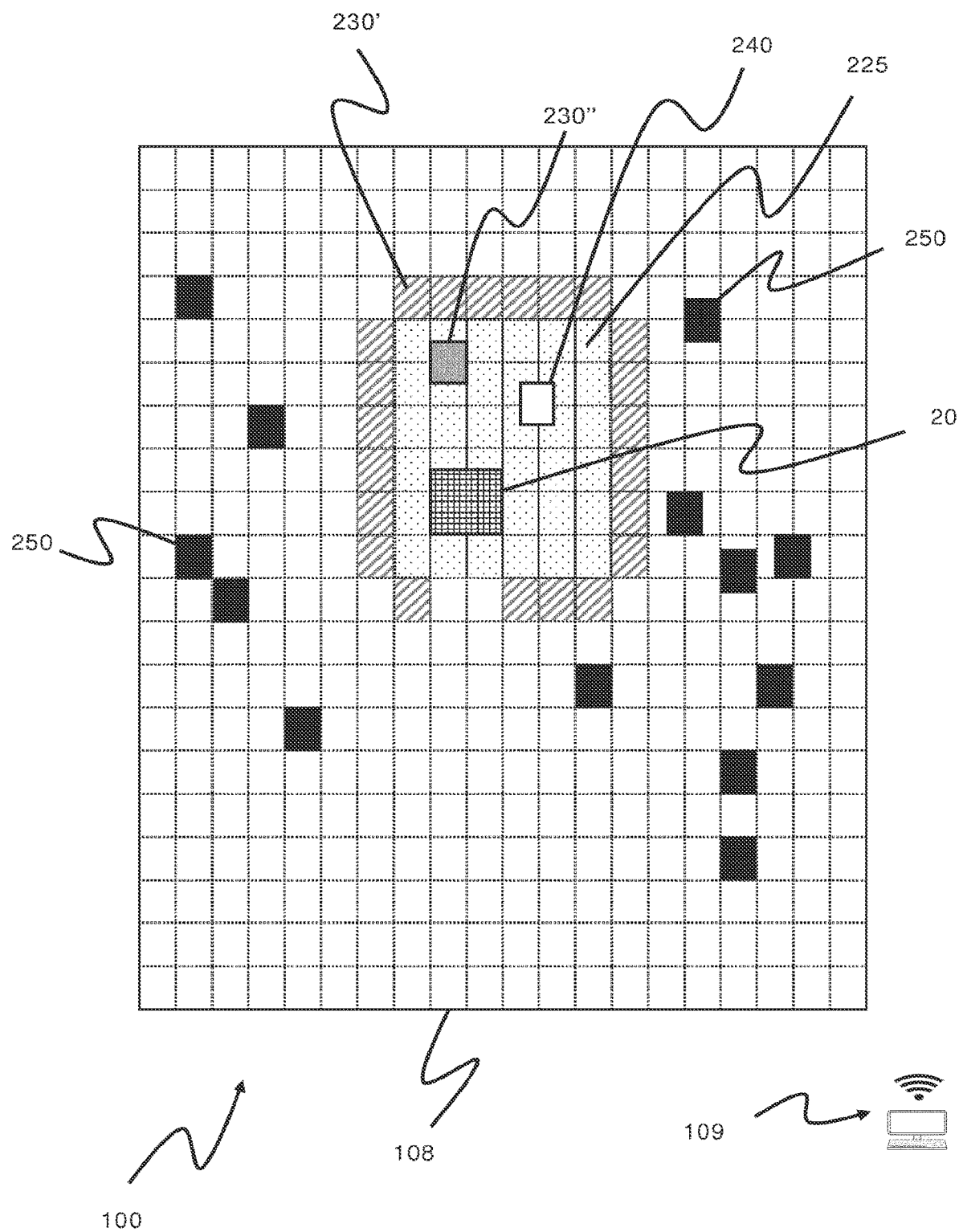
FIG. 4 is a schematic top view of the automated storage and retrieval system according to FIG. 3, where the service vehicle has fully entered the shutdown zone.

A similar scenario as in FIG. 3C is shown in FIG. 4, but where the service vehicle 20 has fully entered a 6×6 grid cell large shutdown zone 20 bounded by 22 parked container handling vehicles 230'. In addition to the malfunctioning vehicle 240, a functioning vehicle 230" has been brought to a halt within the shutdown zone 225 to ensure safe working conditions.

As shown, a central point of the shutdown zone 225 may be offset with respect to the malfunctioning vehicle 240. This creates an area to receive the service vehicle 20 and/or an operator within the shutdown zone 225 whilst minimizing the number of other vehicles 230' required to form the physical barrier.

The barrier in FIG. 4 is set up in the same way as in FIG. 3C, but without vehicles 230' in each corner.

In general, the shutdown zone 225 and the corresponding boundary defining, parked vehicles 230' may be of any shape when viewed from above, for example circular, oval, triangular, hexagonal, octagonal, etc.

If the malfunctioning vehicle 240 has been brought to a halt near an obstacle such as a roof pillar or near a periphery of the rail system 108, a part trigonometric form such as a half-octagonal shape or half-rectangular shape may be advantageous as a barrier.

Further, the boundary setting vehicles 230' may be placed on different positions relative to the boundaries of the shutdown zone 225. In FIGS. 3C and 4 each vehicle 230' is placed outside the boundaries with one of its walls (an outermost vehicle wall from the malfunctioning vehicle 240) at a horizontal/lateral position equal to the corresponding position of the boundaries. However, an alternative position may be envisaged such that each or some of the vehicles 230' are placed at least partly on the boundaries or fully within the shutdown zone 225 with one outer wall at a horizontal/lateral position equal to the corresponding position of the boundaries.

In order to provide a barrier that better may withstand collisions from outside, a barrier of vehicles 230' may also be more than one vehicle wide. Such vehicles 230' may be staggered. In some cases it may be desirable to space some of the vehicles 230' from an adjacent vehicle, but only by an amount which is less than a width of the vehicles 230'.

If the service vehicle 20 enters fully into the shutdown zone 225, the safety for the operator may be further improved by instructing (via the control system 109) additional operative container handling vehicles 250 to close the opening into the shutdown zone 225.

Figure 5A:
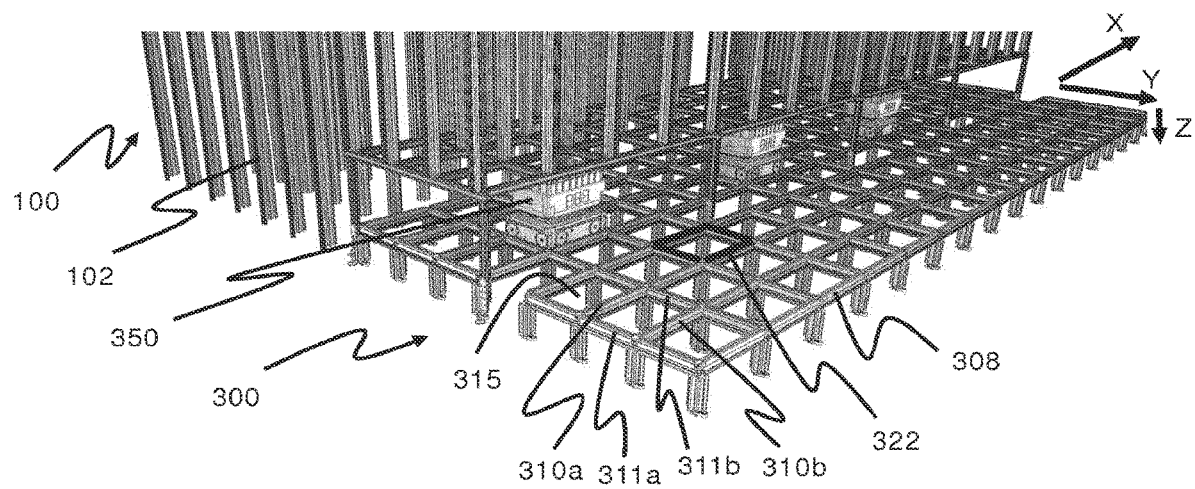
FIGS. 5A and 5B are perspective views of an exemplary automated storage and retrieval system according to the invention, where

A different automated storage and retrieval system 1 is shown in part in FIG. 5A. The upright members 102 constitute part of a framework structure 100 onto which a transport rail system 108 with a plurality of container handling vehicles 250 are operating.

Below this transport rail system 108, near the floor level, another framework structure 300 is shown which partly extends below some of the storage columns 105 of the framework structure 100. As for the other framework structure 100, a plurality of vehicles 330,340,350 may operate on a rail system 308 comprising a first set of parallel rails 310 directed in a first direction X and a second set of parallel rails 311 directed in a second direction Y perpendicular to the first direction X, thereby forming a grid pattern in the horizontal plane $P_L$ comprising a plurality of rectangular and uniform grid locations or grid cells 322. Each grid cell of this lower rail system 308 comprises a grid opening 315 being delimited by a pair of neighboring rails 310a,310b of the first set of rails 310 and a pair of neighboring rails 311a,311b of the second set of rails 311.

The part of the lower rail system 308 that extends below the storage columns 105 are aligned such that its grid cells 322 are in the horizontal plane $P_L$ coincident with the grid cells 122 of the upper rail system 108 in the horizontal plane P.

Hence, with this particular alignment of the two rail systems 108,308, a storage container 106 being lowered down into a storage column 105 by a container handling vehicle 250 can be received by a delivery vehicle 350 configured to run on the rail system 308 and to receive storage containers 106 down from the storage column 105.

Figure 5B:
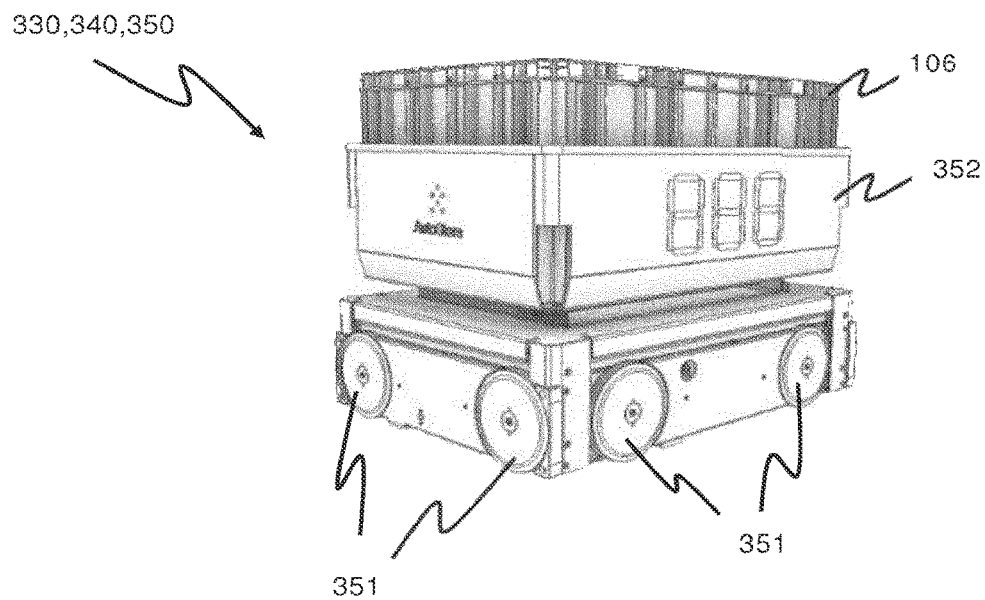

FIG. 5B shows an example of such a vehicle 350 comprising a wheel assembly 351 similar to the wheel assembly 251 described for the prior art container handling vehicle 250 and a storage container support 352 for receiving and supporting a storage container 106 delivered by an above container handling vehicle 250.

After having received a storage container 106, the delivery vehicle 350 may drive to an access station adjacent to the rail system 308 (not shown) for delivery of the storage container 106 for further handling and shipping.

Hereinafter, the upper and lower rail systems 108,308 are called the transport rail system 108 and the delivery rail system 308. Likewise, the vehicle shown in FIG. 5B is called a container delivery vehicle 350.

Figure 6:
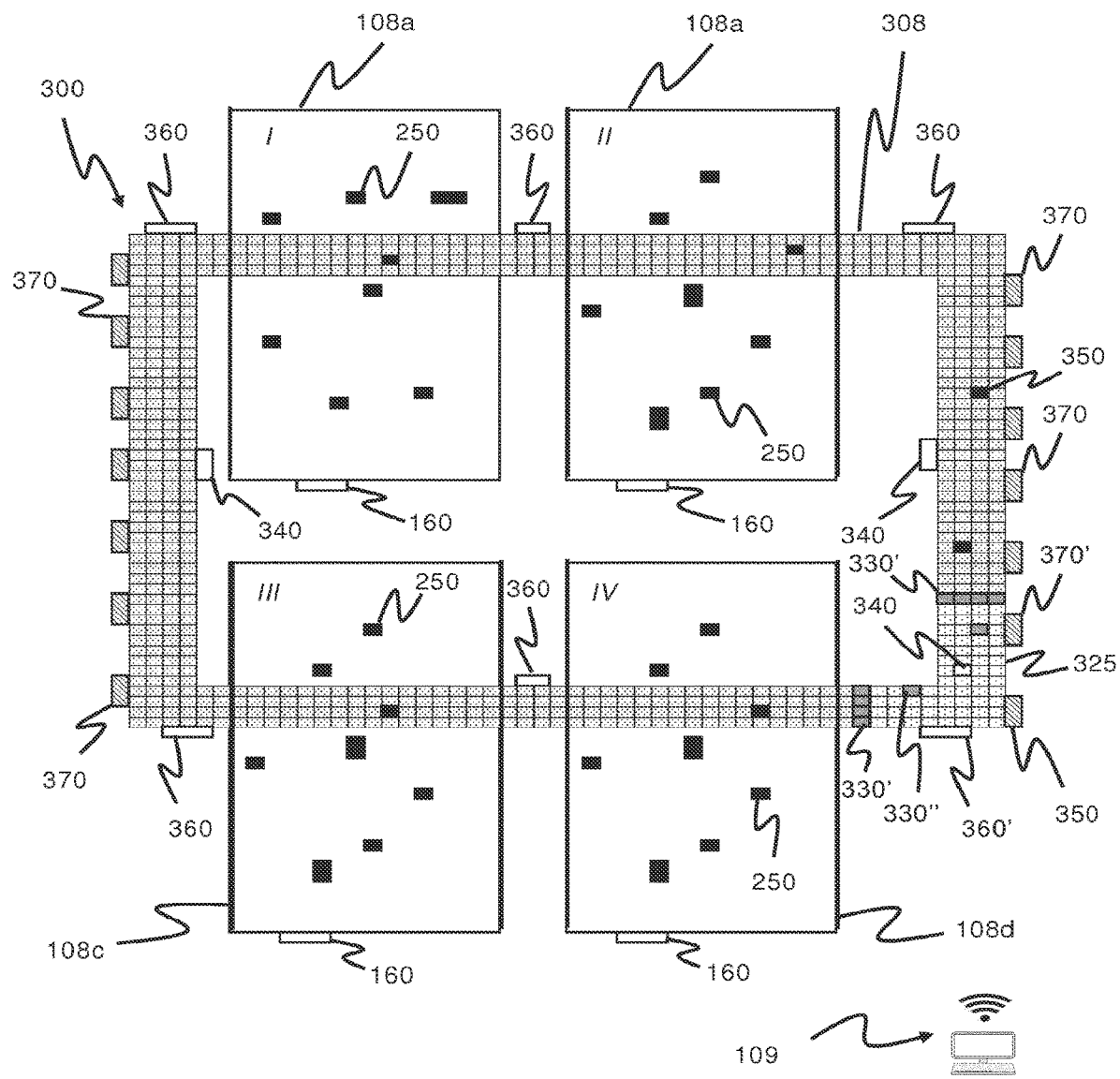
FIG. 6 is a schematic top view of an automated storage and retrieval system according to a third embodiment of the invention, where the system comprises a plurality of transport rail systems with container handling vehicles and one delivery rail system extending below all the transport rail systems.

FIG. 6 shows a third embodiment of an automated storage and retrieval system 1. The system 1 includes four spaced apart transport rail systems 108a-d, each with operative container handling vehicles 250, and a delivery rail system 308 designed as a four grid cells wide path extending below all four of the transport rail systems 108a-d in a closed loop. As a result, any operative container delivery vehicle 350 may receive storage containers 106 from a storage column 105 belonging to any of the transport rail systems 108a-d.

At the outer periphery of the delivery rail system 308 several delivery ports 370 are arranged to receive (and possibly also deliver) storage containers 106 to the container delivery vehicles 350.

The outer periphery also contains a number of access ports 360 distributed in the horizontal plane $P_L$, where each access port 360 is configured to allow entrance of a service vehicle 20 into the delivery rail system 308.

FIG. 6 shows a scenario where the control system 109 has
detected a malfunctioning container delivery vehicle 340, instructed the malfunctioning vehicle 340 to halt,
generated a shutdown zone 325 around the malfunctioning vehicle 340 which includes one of the access ports 360',
instructed eight 330' of the operative container delivery vehicles 350 to halt at the boundaries of the shutdown zone 325 to create a physical barrier for all the operative container delivery vehicles 350 located outside the shutdown zone 325 and
instructing all others container delivery vehicles 330" located within the shutdown zone 325 to halt.

With the scenario depicted in FIG. 6, the service vehicle 20 may enter the access port 360' and drive to the malfunctioning container delivery vehicle 340 with little or no risk of collision with other container delivery vehicles 350 still operative on the delivery rail system 308.

During the operation of one or more service vehicles 20 on the delivery rail system 308, other service vehicles 20 may be operating on the transport rail system(s) 108 by use of the corresponding access ports 160.

Two possible configurations of a service vehicle 20 suitable for the operations described above are shown in FIG. 7A and FIG. 7B.

Both examples of service vehicles 20 comprises a lifting mechanism 24, a seat 25 for the operator and a support base 22 for support of malfunctioning vehicles 240,340 and driving means 23 to enable movement of the service vehicle 20. The service vehicle 20 could of course comprise other configurations and the present invention is not limited to these two examples.

Figure 7A:
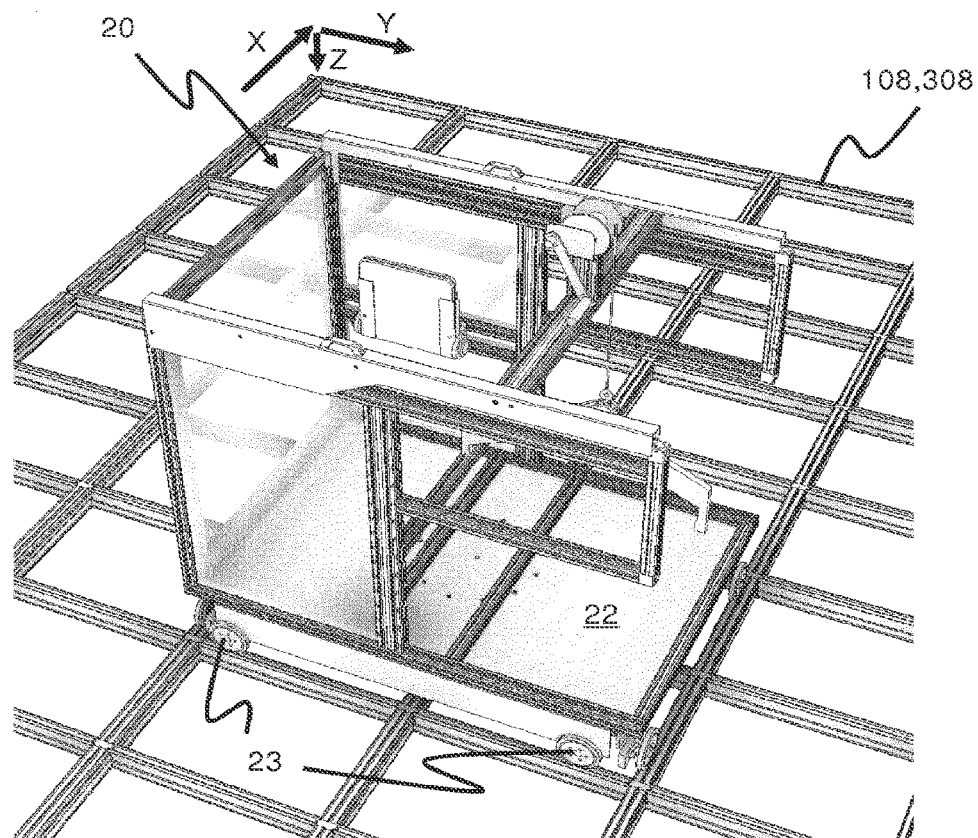
FIGS. 7A and 7B are perspective views of service vehicles suitable for operating on a rail system of an automated storage and retrieval system, where

In FIG. 7A the driving means 23 comprises two set of four wheels, where at least one of the sets may be raised and lowered. Hence, the driving means are similar to the driving means of the above described container handling vehicles 250 and container delivery vehicles 350. The wheels follow the rails 110,310,111,311 of the transport and/or delivery rail system(s) 108,308.

Figure 7B:
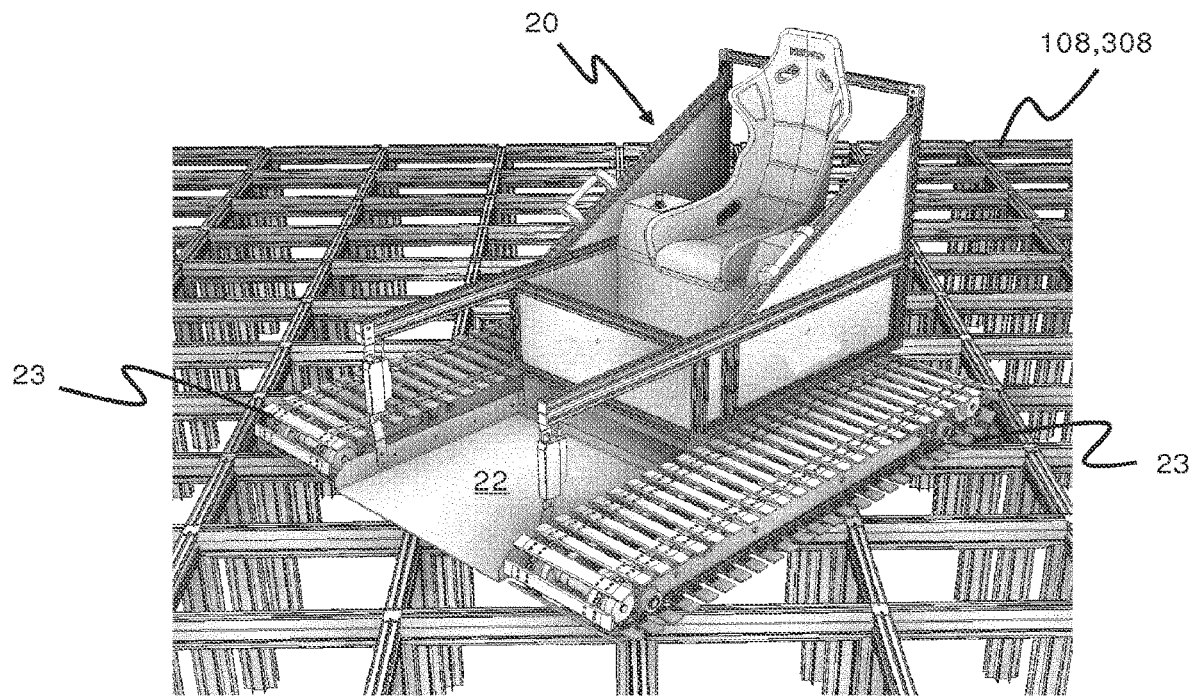

In FIG. 7B the driving means 23 of the service vehicle 20 comprises caterpillar tracks configured to drive on top of the rails 110,310,111,311, thereby allowing movement in any direction in the horizontal planes $P, P_L$ of either the transport rail system 108 or the delivery rail system 308.

Figure 8:
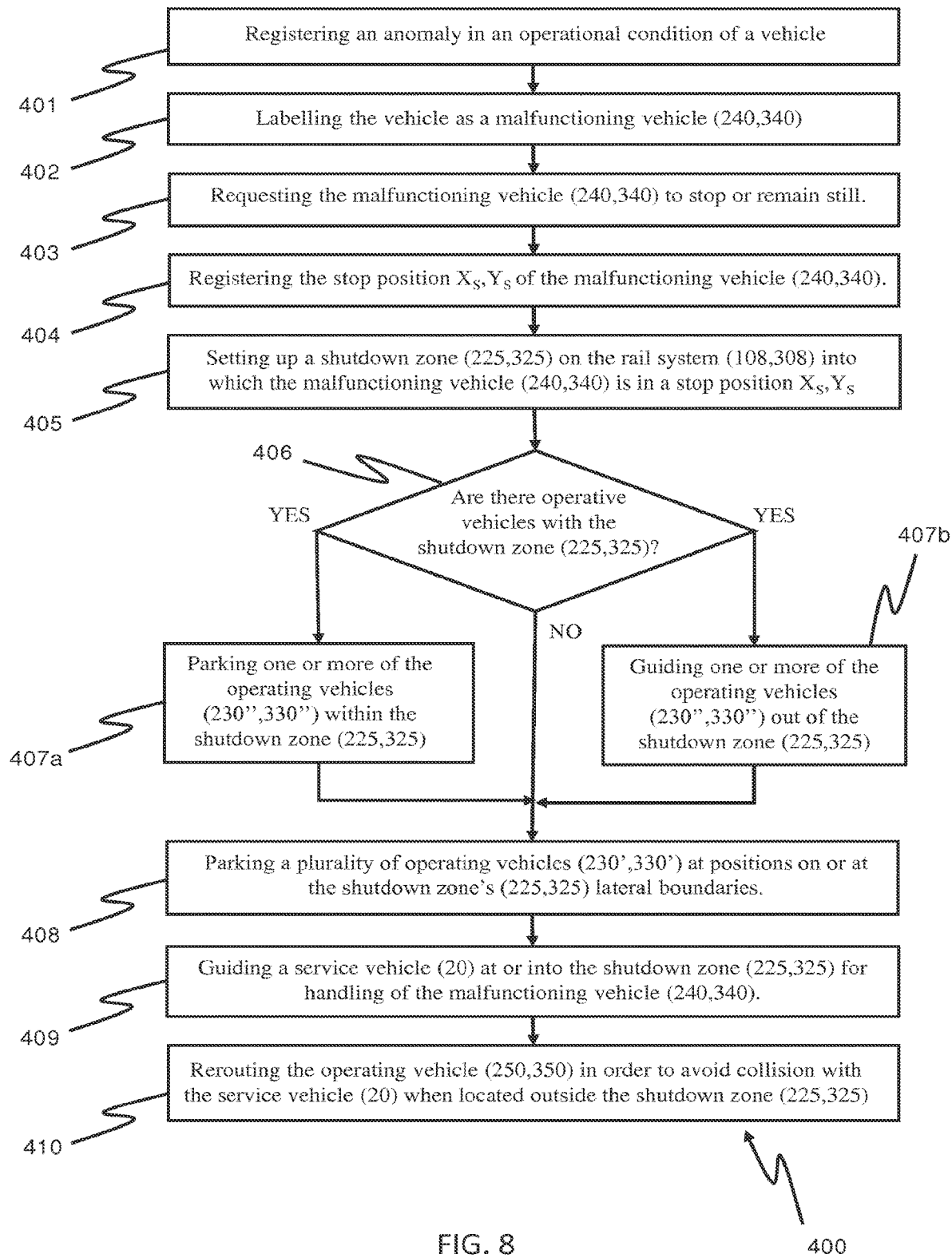
FIG. 8 is a flow sheet describing an example of steps of a method according to the invention.

The service vehicle of FIG. 7B may be used as an alternative to, or in conjunction with, the service vehicle 20 of FIG. 7A A flow chart 400 describing one example of the inventive method is shown in FIG. 8 where the following method steps are executed/controlled by the control system 109:

401. An anomaly in one or more operation conditions of a vehicle 250,350 intended operating on either the transport rail system 108 or the delivery rail system 308 is registered/detected. Examples of operation conditions are positional accuracy, acceleration pattern, temperature, charging efficiency of battery and contact with underlying rail system.

402. The vehicle having the anomaly is labelled as a malfunctioning vehicle 240,340.

403. The malfunctioning vehicle 240,340 is instructed to halt, either immediately or at a specific location on the rail system 108,308.

404. The stop position of the malfunctioning vehicle 240,340 is registered in the control system 109.

405. A shutdown zone 225,325 is generated/set on the rail system 108,308, in which the malfunctioning vehicle 240, 340 has been brought to a halt.

406. Are there any operative vehicles 250,350 within the shutdown zone 225,335?

407. If yes, either
  a. park one or more of the operating vehicles within the shutdown zone or
  b. guide one or more of the operating vehicles out of the shutdown zone, alternatively to a boundary of the shutdown zone 225,335 (see step 408), or
  c. a combination thereof, such that the shutdown zone 225,335 may become void of any operative vehicles 250,350.

408. If not already completed in step 407b, one or more of the operating vehicles 230',330' are brought to a halt at positions on or at the lateral boundaries of the shutdown zone 225,325 in order to create a physical barrier which at least partly prevent other operating vehicles 250,350 to enter.

409. A service vehicle 20 is guided at or into the shutdown zone 225,325 in order to allow handling and/or maintenance of the malfunctioning vehicle 240,340.

410. The operating vehicle 250,350 outside the shutdown zone is rerouted in order to avoid collision with the service vehicle 20 during the travel of the service vehicle 20 between the access station 160 (or any other initial position) and the shutdown zone 225,325

If the operator intends to walk on foot to the malfunctioning vehicle 240,340, i.e. to avoid using a service vehicle 20, a plurality of the operating container handling vehicles 250,350 may be used to create a walking passage between the access port 160,360 and the malfunctioning vehicle 240,340.

For example, the plurality of vehicles 250,350 may be arranged to create two lines of halted vehicles 230',330' extending from the access port 160 and to the boundary of the shutdown zone 225,325 and any vehicle created physical barrier. The distance between the two lines of vehicles 230',330' should be at least one grid cell 122,322 wide, for example three grid cells 122,322 wide.

Such a walking passage may also be a dynamic exclusion zone where the operative vehicles 250,350 are instructed to move at a certain distance from the operator while he or she is on the rail system 108,308.

In the preceding description, various aspects of the method and its related system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and the system, which are apparent to persons skilled in the art to which the disclosed subject matter pertains, are deemed to lie within the scope of the present invention.

LIST OF REFERENCE NUMERALS/LETTERS

1 Automated storage and retrieval system
20 Service vehicle
21 Direction of service vehicle
22 Support base for malfunctioning vehicle
23 Driving means for the service vehicle
24 Lifting mechanism 25 Seat for operator
100 Framework structure
100a First framework structure
100b Second framework structure
100c Third framework structure
102 Upright members of framework structure
103 Horizontal members of framework structure
104 Storage grid/three-dimensional grid
105 Storage column
106 Storage container
107 Stack
108 Transport rail system
108a First transport rail system
108b Second transport rail system
108c Third transport rail system
108d Fourth transport rail system
109 Control system
110 First set of parallel rails in first direction (X)
111 Second set of parallel rails in second direction (Y)
115 Grid opening in transport rail system
119 Delivery column
120 Delivery column
122 Grid cell of transport rail system
125 Vehicle blocking barrier
130 Vehicle passage between transport rail systems
130a First passage
130b Second passage
160 Access port to transport rail system for service vehicle
160a First access station
160b Second access station
160c Third access station
225 Shutdown zone on transport rail system
230 Parked container handling vehicle
230' Boundary defining, parked vehicle
230" Non-boundary defining, parked vehicle
240 Malfunctioning container handling vehicle
250 Operative container handling vehicle
251 Wheel assembly for container handling vehicle
252 Vehicle body for container handling vehicle
300 Delivery framework structure
308 Delivery rail system
310 First set of parallel rails in first direction (X) on delivery rail system
311 Second set of parallel rails in second direction (Y) on delivery rail system
315 Grid opening in delivery rail system
322 Grid cell of delivery rail system
325 Shutdown zone on delivery rail system
330 Parked container delivery vehicle
330' Boundary defining, parked vehicle
330" Non-boundary defining, parked vehicle 340 Malfunctioning container delivery vehicle
350 Operative container delivery vehicle
351 Wheel assembly for container delivery vehicle
352 Storage container support
360 Access station to delivery rail system for service vehicle
360' Access station to shutdown zone of delivery rail system for service vehicle
370 Delivery port for delivering storage containers by container delivery vehicles
400 Flow chart for handling malfunctioning vehicles
401 Registering an anomaly in an operational condition of a vehicle
402 Labelling the vehicle as a malfunctioning vehicle
403 Requesting the malfunctioning vehicle to stop or remain still
404 Registering the stop position of the malfunctioning vehicle
405 Setting up a shutdown zone on the rail system into which the malfunctioning vehicle is in a stop position
406 Presence of operative vehicles within the shutdown zone?
407a Parking any operating vehicles within the shutdown zone
407b Guiding any operating vehicles out of the shutdown zone
408 Parking a plurality of operating vehicles at positions on or at the shutdown zone's lateral boundaries
409 Guiding a service vehicle into the shutdown zone for handling of the malfunctioning vehicle
410 Rerouting the operating vehicle in order to avoid collision with the service vehicle when located outside the shutdown zone
X First direction
Y Second direction
Z Third direction
P Horizontal plane of rail system

What is claimed is:

1. A method for handling malfunctioning vehicles on a rail system constituting part of a storage and retrieval system, the method comprising:
storing a plurality of stacks of storage containers,
wherein the storage and retrieval system comprises a plurality of remotely operated vehicles configured to move laterally on the rail system;
wirelessly monitoring and controlling, via a control system, movements of the plurality of remotely operated vehicles;
performing steps, via the control system by wireless data communication, comprising:
A. registering an anomaly in an operational condition of a vehicle on the rail system;
B. registering the vehicle with the anomaly in the operational condition as a malfunctioning vehicle;
C. bringing the malfunctioning vehicle to a halt;
D. registering a halt position of the malfunctioning vehicle relative to the rail system;
E. setting up a two-dimensional shutdown zone within the rail system into which the malfunctioning vehicle is halted; and
F. updating a movement pattern of the plurality of remotely operated vehicles outside the two-dimensional shutdown zone such that entrance into the two-dimensional shutdown zone is avoided.

2. The method in accordance with claim 1, wherein the method further comprises:
rerouting at least one vehicle of the plurality of remotely operated vehicles other than the malfunctioning vehicle to a position on the rail system located at a boundary of the two-dimensional shutdown zone; and
bringing the at least one vehicle to a halt.

3. The method in accordance with claim 1, wherein the method further comprises after step E or F,
determining whether other vehicles are operating within the two-dimensional shutdown zone.

4. The method in accordance with claim 3, wherein the method further comprises:
rerouting said other vehicles to continue operation outside the two-dimensional shutdown zone if one or more additional vehicles are operating within the two-dimensional shutdown zone.

5. The method in accordance with claim 3, wherein the method further comprises:
bringing said other vehicles to a halt within or at the two-dimensional shutdown zone if one or more of the other vehicles are operating within the two-dimensional shutdown zone.

6. The method in accordance with claim 1, wherein the method further comprises:
guiding a service vehicle to a position at or within the two-dimensional shutdown zone.

7. The method in accordance with claim 6, wherein the service vehicle is guided from an access port at a lateral boundary of the rail system.

8. The method in accordance with claim 6, wherein the service vehicle comprises a caterpillar track configured to drive on top of the rail system.

9. The method in accordance with claim 1, wherein the method further comprises:
dynamically rerouting any operating vehicles outside the two-dimensional shutdown zone to avoid physical impact with a service vehicle during transport of the service vehicle to the two-dimensional shutdown zone and/or an operator walking to the two-dimensional shutdown zone.

10. The method in accordance with claim 9, wherein the method further comprises:
rerouting operating vehicles other than the malfunctioning vehicle to positions on the rail system located at a boundary of the two-dimensional shutdown zone to create a physical barrier of vehicles around the malfunctioning vehicle; and
bringing the operating vehicles other than the malfunctioning vehicle to a halt.

11. The method in accordance with claim 10, wherein the method further comprises guiding the service vehicle to a position at or within the two-dimensional shutdown zone, and wherein the physical barrier of vehicles comprises an opening with a width larger than the width of the service vehicle, thereby allowing the service vehicle to enter into the two-dimensional shutdown zone or to form part of the physical barrier of vehicles.

12. The method in accordance with claim 1, wherein the rail system comprises:
a first rail system;
a second rail system; and
a vehicle blocking barrier arranged between the first rail system and the second rail system,
wherein the vehicle blocking barrier comprises a vehicle passage having a minimum lateral width allowing one of the plurality of remotely operated vehicles to move into the vehicle passage.

13. The method in accordance with claim 12, wherein the method further comprises:
rerouting at least one vehicle of the plurality of remotely operated vehicles other than the malfunctioning vehicle to a position within the vehicle passage; and
bringing the at least one vehicle to a halt.

14. The method in accordance with claim 1, wherein the storage and retrieval system comprises:
a transport rail system at height $H_T$ onto which a plurality of remotely operated container handling vehicles are configured to move laterally; and
a delivery rail system at height the height $H_D$ less than the height $H_T$ onto which a plurality of remotely operated container delivery vehicles are configured to move laterally and to receive storage containers from higher located container handling vehicles,
wherein steps B-F of the method are performed for
the plurality of remotely operated container handling vehicles in a case where the control system registers an anomaly in an operational condition of a container handling vehicle; or
the plurality of remotely operated container delivery vehicles in a case where the control system registers an anomaly in an operational condition of a container delivery vehicle; or
the plurality of remotely operated container handling vehicles and for the plurality of remotely operated container delivery vehicles in a case where the control system registers an anomaly in an operational condition of both a container handling vehicle and a container delivery vehicle.

15. The method in accordance with claim 14, further comprising:
lifting, via each of the plurality of remotely operated container handling vehicles, the storage containers stacked in the plurality of stacks through openings in the transport rail system using a lifting device, wherein the transport rail system comprises a first set of parallel rails arranged in a first direction and a second set of parallel rails arranged in a second direction orthogonal to the first direction;
moving, via each of the plurality of remotely operated container handling vehicles, the storage containers to other locations on the transport rail system; and
lowering, via each of the plurality of remotely operated container handling vehicles, the storage containers down to the delivery rail system using the lifting device.

16. The method in accordance with claim 14,
wherein each of the plurality of remotely operated container delivery vehicles comprises:
a set of wheels configured to move the container delivery vehicle along rails of the delivery rail system;
a drive motor configured to provide rotational power to the set of wheels; and
a container carrier configured to receive a storage container from above and onto, or at least partly into, the container carrier,
wherein the delivery rail system comprises a first set of parallel rails arranged in a first direction and a second set of parallel rails arranged in a second direction orthogonal to the first direction.

17. The method in accordance with claim 14,
wherein the transport rail system comprises a plurality of laterally spaced apart transport rail system modules onto which the plurality of remotely operated container handling vehicles are moving, and
wherein the delivery rail system is configured such that one of the plurality of remotely operated container delivery vehicles is allowed to move below all or more than one of the plurality of laterally spaced apart transport rail system modules during normal operation.

18. The method in accordance with claim 14, wherein the method further comprising rerouting the plurality of remotely operated container delivery vehicles away from a two-dimensional zone projected down to the delivery rail system from any two-dimensional shutdown zones set up on the transport rail system.

19. A control system for handling malfunctioning vehicles on a rail system, the control system comprising:
a computer program executed on a processor configured to control an automated storage and retrieval system,
wherein the automated storage and retrieval system is configured to
store a plurality of stacks of storage containers,
wherein the automated storage and retrieval system comprises a plurality of remotely operated vehicles configured to move laterally on the rail system; and
wirelessly monitor and control movements of the plurality of remotely operated vehicles; and
a wireless data communication, via which the control system is configured to
A. register an anomaly in an operational condition of a vehicle on the rail system;
B. register the vehicle with the anomaly in the operational condition as a malfunctioning vehicle;
C. bring the malfunctioning vehicle to a halt;
D. register a halt position of the malfunctioning vehicle relative to the rail system;
E. set up a two-dimensional shutdown zone within the rail system into which the malfunctioning vehicle is halted; and
F. update a movement pattern of the plurality of remotely operated vehicles outside the two-dimensional shutdown zone such that entrance into the two-dimensional shutdown zone is avoided.

* * * * *